(12) United States Patent
Peng

(10) Patent No.: US 9,310,277 B2
(45) Date of Patent: Apr. 12, 2016

(54) TIRE TEMPERATURE AND TIRE PRESSURE WIRELESS SENSING DEVICE

(71) Applicant: Ta-Min Peng, Taipei (TW)

(72) Inventor: Ta-Min Peng, Taipei (TW)

( * ) Notice: Subject to any disclaimer, the term of this patent is extended or adjusted under 35 U.S.C. 154(b) by 474 days.

(21) Appl. No.: 13/931,912

(22) Filed: Jun. 29, 2013

(65) Prior Publication Data

US 2014/0010265 A1 Jan. 9, 2014

(30) Foreign Application Priority Data

Jul. 6, 2012 (TW) .............................. 101213048 U
Jan. 29, 2013 (TW) .............................. 102201932 U

(51) Int. Cl.
| G01K 11/00 | (2006.01) |
| G01K 13/00 | (2006.01) |
| G01M 17/02 | (2006.01) |
| G01L 17/00 | (2006.01) |

(52) U.S. Cl.
CPC ............... *G01M 17/02* (2013.01); *G01L 17/00* (2013.01)

(58) Field of Classification Search
CPC ....... G01H 17/02; G01K 11/00; G01K 13/00; G01M 17/02
USPC ............. 374/141–143, 208, 120; 340/870.17, 340/442, 443, 449; 73/146, 146.2, 146.4, 73/146.5
See application file for complete search history.

(56) References Cited

U.S. PATENT DOCUMENTS

| 5,774,048 A * | 6/1998 | Achterholt | B60C 23/0408 340/442 |
| 5,977,870 A * | 11/1999 | Rensel | B60C 23/0408 340/443 |
| 6,799,455 B1 * | 10/2004 | Neefeldt | B60C 23/0496 73/146 |
| 6,921,197 B2 * | 7/2005 | Aubel | B60C 23/20 374/120 |
| 6,952,955 B1 * | 10/2005 | Uleski | B60C 23/0408 73/146 |
| 6,993,962 B1 * | 2/2006 | Ko | B60C 23/0408 73/146.5 |
| 7,565,832 B2 * | 7/2009 | Huang | B60C 23/0496 340/442 |
| 8,966,968 B2 * | 3/2015 | Li | B60C 23/0496 73/146 |
| 8,988,209 B2 * | 3/2015 | Cantarelli | B60C 23/0408 340/438 |
| 2002/0124637 A1 * | 9/2002 | Saheki | B60C 23/0494 73/146 |
| 2007/0193349 A1 * | 8/2007 | Petrucelli | B60C 23/0496 73/146.8 |
| 2010/0001852 A1 * | 1/2010 | Isono | B60C 23/12 340/442 |
| 2011/0048121 A1 * | 3/2011 | van der Blom | G01D 7/00 73/146.3 |
| 2011/0212348 A1 * | 9/2011 | Yasui | H01M 2/1077 429/7 |
| 2012/0000277 A1 * | 1/2012 | Fischer | B60C 23/041 73/146.3 |
| 2013/0083326 A1 * | 4/2013 | Clark | G01K 1/16 356/459 |

* cited by examiner

*Primary Examiner* — Gail Kaplan Verbitsky
(74) *Attorney, Agent, or Firm* — Cheng-Ju Chiang

(57) ABSTRACT

A tire temperature and tire pressure wireless sensing device is provided, which includes a housing, a valve body, a power supply module, a circuit board and a transmission antenna. The power supply module is disposed on the fixed seat of the housing, and the circuit board includes a wireless transmission module and a sensing module thereon. The sensing module is disposed corresponding to an air-intake through hole of the bottom seat of the housing. The valve body is engaged with the air-intake through hole and one end of the transmission antenna is disposed in an antenna slot.

14 Claims, 8 Drawing Sheets

TIRE TEMPERATURE AND TIRE PRESSURE WIRELESS SENSING DEVICE

FIELD OF THE INVENTION

The present invention relates to a tire temperature and tire pressure sensing device, and in particular to a tire temperature and tire pressure sensing device for detecting the instant and accurate gas temperature and gas pressure, emitting the effective wireless signal and preventing the signal attenuation and is suitable for an air-intake mouth of all kinds of wheel.

BACKGROUND OF THE INVENTION

The conventional tire temperature and tire pressure wireless sensing device includes an air-intake device, a bidirectional sleeves and a cap. The air-intake device includes an in-take seat. One end of the intake seat is connected with an intake mouth of wheel. The bidirectional sleeves include a separation part, in which a first connection part and a second connection part are disposed two opposite ends of the separation part respectively. The first connection part is engaged with another end of the air-intake seat to form an air chamber which used to accommodate the air pressure sensing device therein. The tire pressure sensing device includes a circuit board and a sensing device on the circuit board. The second connection part is engaged with the cap to form an accommodation space. A power supply is disposed in the accommodation space. The drawback of above tire temperature and tire pressure wireless sensing device includes: for the tire temperature and tire pressure wireless sensing device, a metal connection terminal is welded on the circuit board and the circuit board which is pressed-fit to cause the metal connection terminal that is electrically connected with the housing. The wireless signal will be attenuated and the poor contact of the metal connection terminal during the operation. In addition, the oxidation or dirt of the air-intake mouth will be affected the wireless signal transmission, when the tire temperature and tire pressure wireless sensing device utilizes the housing as an antenna conductor and the air-intake mouth as an antenna. Secondly, when the sensing device is disposed on the top of the circuit board, and the air-intake through hole is disposed on air-intake seat which is disposed on the bottom of the circuit board, the gas should be passed through the circuit board to be detected by the sensing device, such that the detection data is not to be detected in instant and is not accurate. Thirdly, the power supply is constructed of a battery and two battery springs, in which the battery is disposed in a recess of the second connection part and two battery springs are contacted with two electrodes of the battery respectively. When the battery is replaced, the two battery springs are need to switch by the sharp object, such that the replacement of the battery is not convenient for user, and the battery or two battery springs will be damaged, deformed or the poor electrical contact is generated.

SUMMARY OF THE INVENTION

A mainly objective of the present invention is to provide a tire temperature and tire pressure wireless sensing device. A sensing module of the tire temperature and tire pressure wireless sensing device is corresponding to an air-intake through hole on a bottom seat, and a valve body is engaged with the air-intake through hole, and thus the tire temperature and tire pressure wireless sensing device can directly detect the gas which is discharged from the valve body and detect the instant and accurate gas temperature and pressure.

Another object of the invention is to provide a tire temperature and tire pressure wireless sensing device. One end of the transmission antenna is disposed in the antenna slot and is electrically connected with the circuit board, in which the transmission antenna is not electrically connected with the battery and wheels, such that the effective emitting wireless signal can be achieved and the signal attenuation effect can be prevented.

It is still another objective of the invention is to provide a tire temperature and tire pressure wireless sensing device. The circuit board of the invention includes a wireless transmission module with a wireless read and write program to achieve the wireless read and write program effect.

It is yet objective of the invention is to provide a tire temperature and tire pressure wireless sensing device. The invention utilizes a semi-circular sidewall on the top of the fixed seat and the battery is clamped between a first conductive element and a second conductive element, such that the battery can be replaced easily.

It is an objective of the invention is to provide a tire temperature and tire pressure wireless sensing device. A bottom side of the bottom seat is engaged with an insulation theft-proof element and a sealing metal spacer to prevent the leakage and theft.

According to above objectives, the invention provides a tire temperature and tire pressure wireless sensing device, which includes a housing, a valve body, a power supply module, a circuit board, and a transmission antenna. The housing includes a fixed seat, a bottom seat with a first recess, and a cap with a second recess. The bottom side of the fixed seat is engaged with the bottom seat to form an air chamber, and the bottom seat is engaged with the cap to form an accommodation space. The bottom seat includes an air-intake through hole and an air-intake seat which is communicated with the bottom side of the air-intake through hole. The valve body is disposed in the air-intake seat, and the valve body is engaged with the air-intake through hole. The circuit board is disposed in the air chamber, and the circuit board includes a wireless transmission module, a sensing module, and an antenna slot. The circuit board is electrically connected with the wireless transmission module and the sensing module, and the sensing module is disposed corresponding to the air-intake through hole. The power supply module is disposed on the fixed seat and the power supply module includes a battery, a first conductive element and a second conductive element, in which one end of the first conductive element and one end of the second conductive element are electrically connected with the circuit board respectively, and another end of the first conductive element and another end of the second conductive element are electrically connected with two electrodes of the battery respectively. One end of the transmission antenna is disposed in the antenna slot and is electrically connected with the circuit board.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

Figure 1:
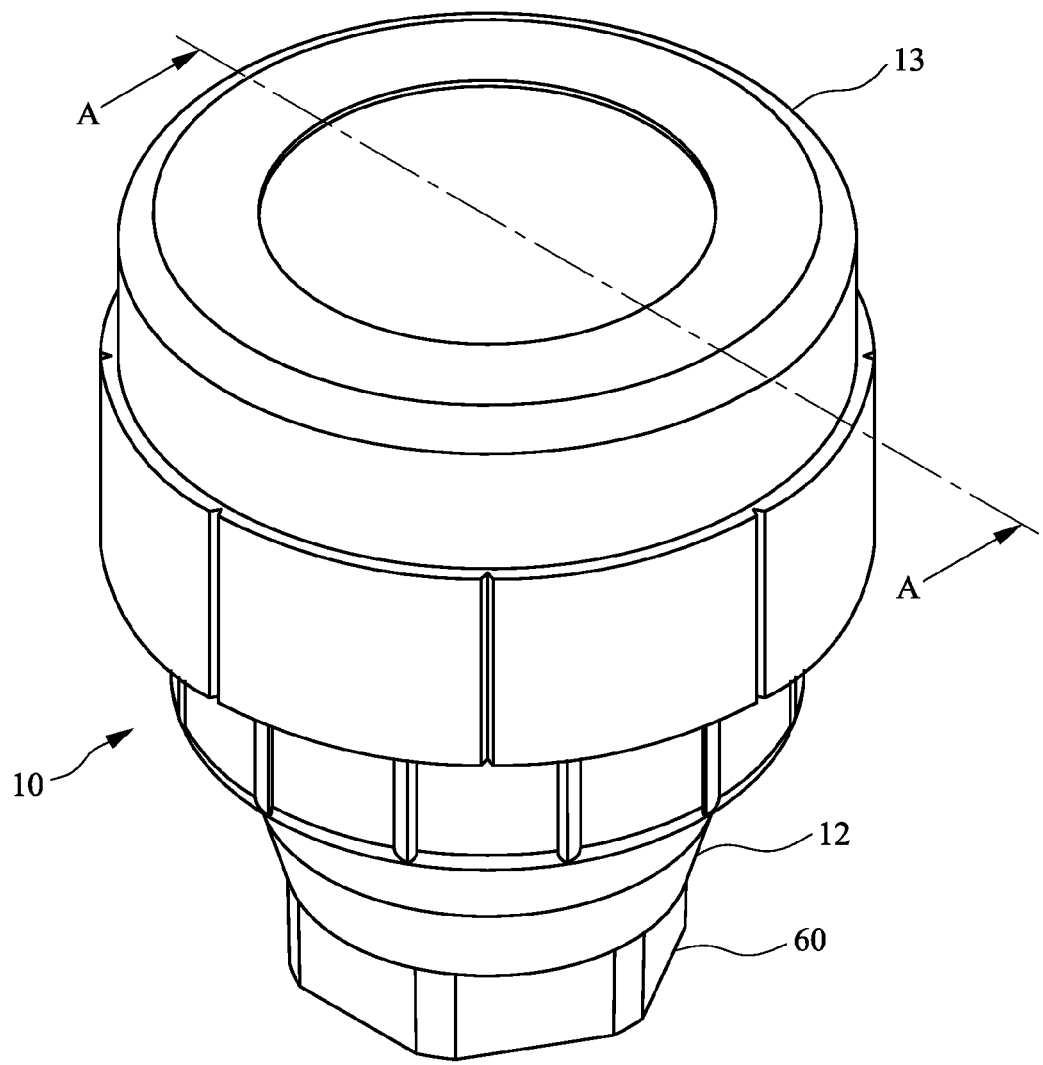
FIG. 1 is a perspective view of a first embodiment of a tire temperature and tire pressure wireless sensing device in accordance with the present invention.
Figure 2:
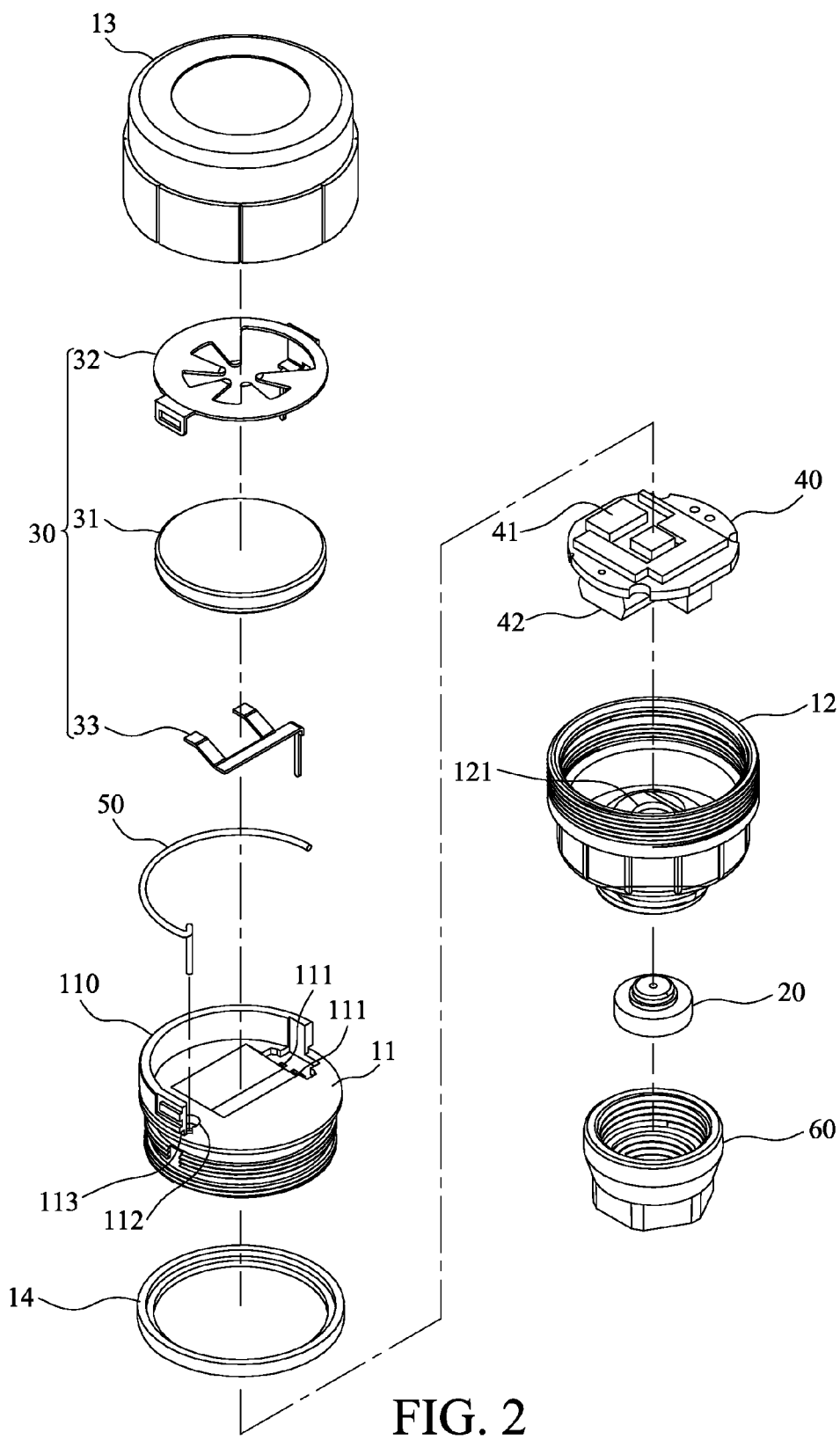
FIG. 2 is an exploded view of a first embodiment of a tire temperature and tire pressure wireless sensing device in accordance with the present invention.
Figure 3:
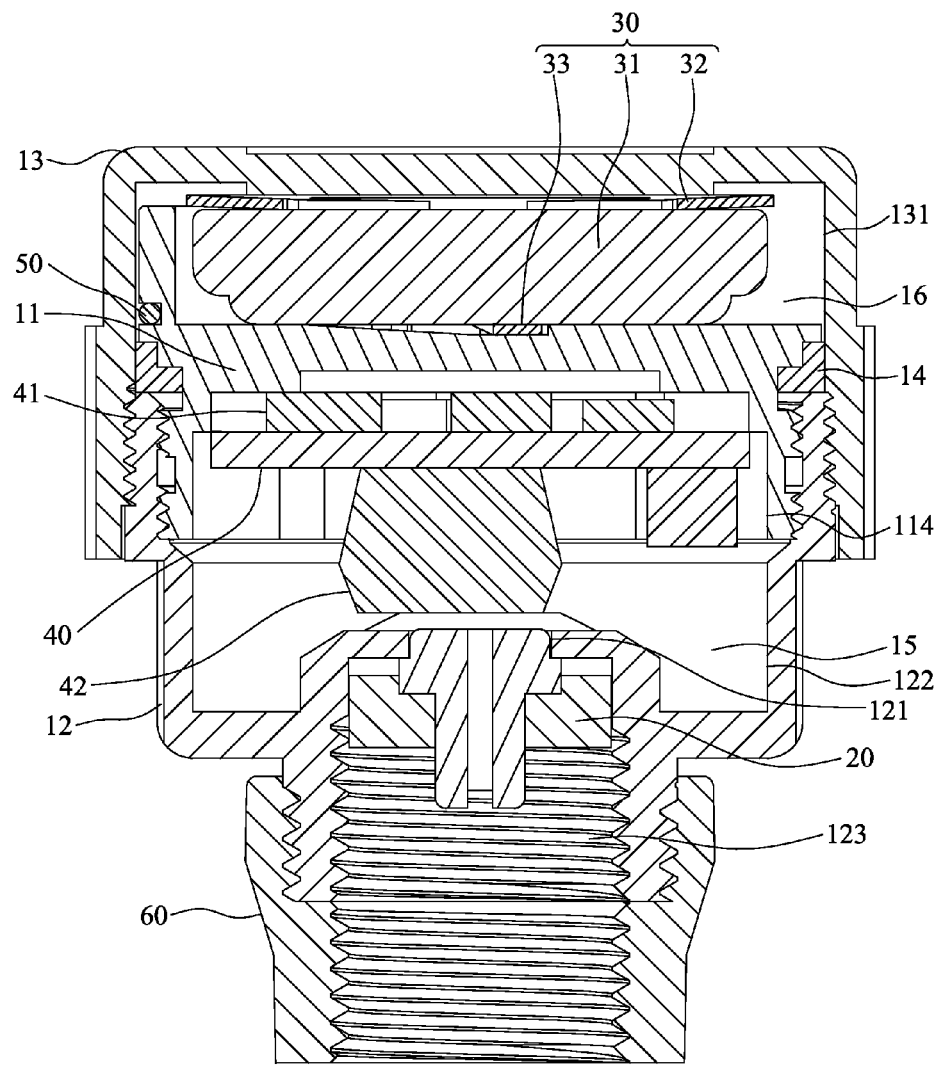
FIG. 3 is a cross-sectional view taken along line A-A of FIG. 1.
Figure 4:
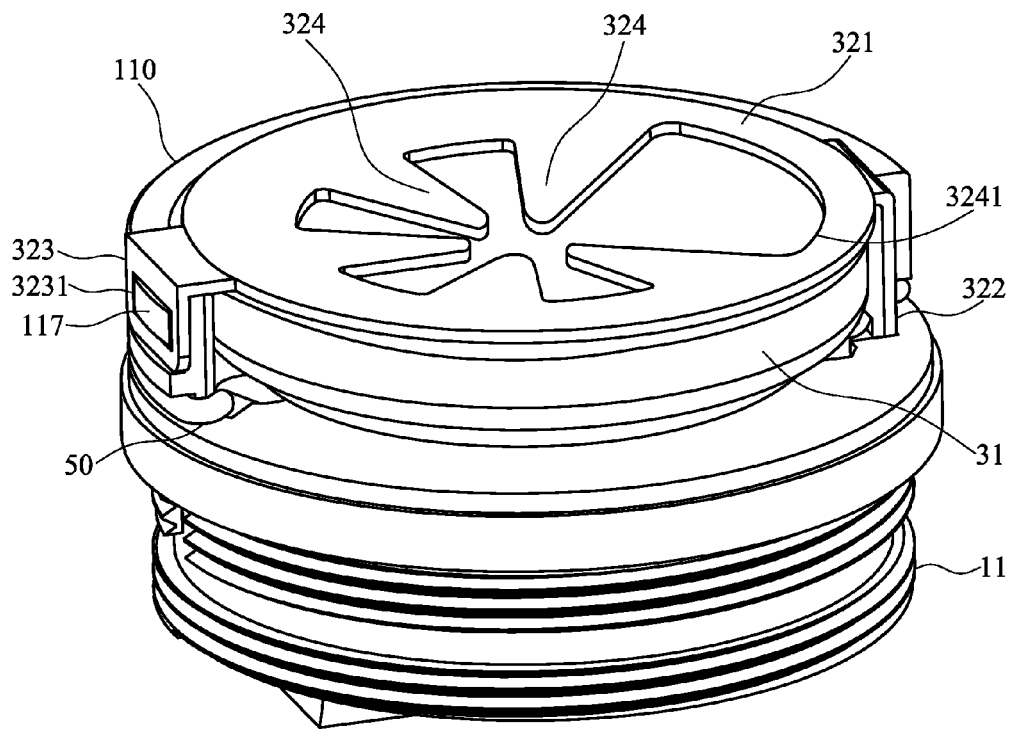
FIG. 4 is a perspective view of a power supply module disposed on the fixed seat of a first embodiment of a tire temperature and tire pressure wireless sensing device in accordance with the present invention.

With reference to the drawings and in particular to FIG. 1 to FIG. 4, a structure of a first embodiment of a tire temperature and a tire pressure wireless sensing device is shown. The tire temperature and tire pressure wireless sensing device is engaged with an air-intake mouth of the wheel to sense gas temperature and pressure inside the wheel to obtain the usage condition of the tire to increase the drive safety. The tire temperature and tire pressure wireless sensing device includes a housing 10, a valve body 20, a power supply module 30, a circuit board 40 and a transmission antenna 50.

The housing 10 is engaged with the air-intake mouth (not shown), which includes a fixed seat 11, a bottom seat 12 with a first recess 122 and a cap 13 with a second recess 131. The fixed seat 11 is made by plastic injection molding. The bottom side of the fixed seat 11 includes a circular sidewall and the circular sidewall is engaged with the bottom seat 12 to form an air chamber 15. In this embodiment, the bottom side of the fixed seat 11 includes a corresponding recess 114, and the corresponding recess 114 is formed on the circular sidewall, in which the outside of the circular sidewall includes an outer thread. A top of the bottom seat 12 includes a first recess 122. The inner wall of the first recess 122 includes an inner thread to engage with the outside of the circular sidewall of the fixed seat 11, and to engage with the corresponding recess 114 of the fixed seat 11 to form the air chamber 15. The top side of the fixed seat 11 includes a semi-circular sidewall 110. The bottom seat 12 is engaged with the cap 13 to form an accommodation space 16 therein. In this embodiment, an outside of the bottom seat 12 includes an outer thread. The cap 13 includes a second recess 131 and the inner wall of the second recess 131 includes an inner thread therein. The inner thread of the second recess 131 is screwed to the outer thread of the bottom seat 12 to form the accommodation space 16. The semi-circular sidewall of the fixed seat 11 includes an annular groove 113. The annular groove 113 is mounted on the cap 13. The fixed seat 11 includes two conductive element through holes 111 and an antenna slot 112. The conducive element through hole 111 and the antenna slot 112 are passed through the fixed seat 11 respectively. One end of the annular groove 113 is disposed adjacent to the antenna slot 112. The bottom seat 12 includes an air-intake through hole 121 and an air-intake seat 123 which is communicated with the bottom side of the air-intake through hole 121. Preferably, the fixed seat 11 is further engaged with a sealing glue ring 14. The central of the outside of the fixed seat 11 includes a groove therein, and the sealing glue ring 14 is disposed in the groove and is further disposed on the junction portion between the fixed seat 11 is engaged with the bottom seat 12 to increase the tightness of the air chamber 15 to obtain the completely airtight, so as to increase the accuracy of detection.

The valve body 20 is disposed in the air-intake seat 123. One end of the valve body 20 is engaged with the air-intake through hole 121.

The power supply module 30 is disposed in the fixed seat 11 and is accommodated in the accommodation spacer 16, in which the power supply module 30 includes a battery 31, a first conductive element 32 and a second conductive element 33. One end of the first conductive element 31 and one end of the second conductive element 32 are inserted into the two conductive element through holes 111 of the fixed seat 11 respectively, and are electrically connected with the circuit board 40. Another end of the first conductive element 31 and another end of the second conductive element 32 are electrically connected with the two electrodes of the battery 31 respectively, in which the first conductive element 32 and the second conductive element 33 are disposed on the top and bottom of the battery 31 respectively. One end of the first conductive element 32 is disposed across the battery 31 and is inserted into a conductive element through hole 111 of the fixed seat 11, whereby the battery 31 is clamped between the first conductive element 32 and the second conductive element 33 and is disposed on the fixed seat 11. The battery 31 can be replaced easily when one edge of the top side of the fixed seat 11 is a semi-circular sidewall 110 and another edge opposite to one edge of the top side of the fixed seat 11 is a semi-circular notch. In this embodiment, the first conductive element 32 includes an outer ring 321, two extension segments 322, 323 and a plurality of claw springs 324, in which the plurality of claw springs 324 is protruded inwardly and downwardly to contact the battery 31 and a notch 3241 is disposed between the plurality of claw springs 324, such that the battery 31 can be replaced easily. Two extension segments 322, 323 are bent and extended downwardly from the two opposite end of the outer ring 321 and across the battery 31, in which one of two extension segments 322 is inserted into a conductive element through hole 111 of the fixed seat 11, and another extension segment 323 includes a button hole 3231 which is snap-fitted on the protrusion 117 of the sidewall of the fixed seat 11.

The circuit board 40 is disposed on the air chamber 15, and the circuit board 40 is electrically connected with the first conductive element 32 and the second conductive element 33. The circuit board 40 includes a wireless transmission module 41 and a sensing module 42, and the circuit board 40 is electrically connected with the wireless transmission module 41 and the sensing module 42 respectively. The sensing module 42 is disposed corresponding to the air-intake through hole 121. The sensing module 42 transmits the detection data to the circuit board 40, and the wireless transmission module 41 emits the wireless signal through the antenna 50. In this embodiment, the wireless transmission module 41 is disposed on the top side of the circuit board 40, and the sensing module 42 is disposed on the bottom side of the circuit board 40 and is disposed corresponding to the air-intake through hole 121. The sensing module 42 can detect the gas which is discharged from the valve body 20 directly, such that the instant and accurate gas temperature and pressure can be detected when the sensing module 42 is disposed corresponding to the air-intake through hoe 121 of the bottom seat 12 and one end of the valve 20 is engaged with the air-intake through hole 121.

The transmission antenna 50 is disposed in the annular grove 113. One end of the transmission antenna 50 is accommodated in the antenna slot 112 and is electrically connected with the circuit board 40. Preferably, a glue layer (not shown) is coated on the junction portion between the transmission antenna 50 and the antenna slot 112 to prevent the gas leakage. In this embodiment, the transmission antenna 50 is G-shaped metal conductor, but the shaped of the metal conductor is not limited herein. Thus, when the transmission antenna 50 is disposed around the sidewall of the fixed seat 11, the transmission antenna 50 is disposed between the battery 31 and the bottom seat 12, and the transmission antenna 50 is not contacted with the bottom seat 12, the wheel (not shown) and the car body, such that the transmission antenna 50 can emit the wireless signal and prevent the signal attenuation. In addition, the transmission antenna 50 is disposed on the annular groove 113 of the fixed seat 11, such that the transmission antenna 50 can be positioned to avoid falling.

Preferably, the bottom side of the bottom seat 12 is further engaged with an insulation theft-proof element 60. The outer of the bottom side of the bottom seat 12 includes an outer thread, and the top side of the insulation theft-proof element 60 includes a first inner thread corresponding to the outer thread to screw each other, and inside of the bottom side of the bottom seat 12 includes an inner thread. The bottom side of the insulation theft-proof element includes a second inner thread, in which the second inner thread is connected to the inner thread on the bottom side of the bottom seat 12 in the same spiral direction, and the spiral direction of the second inner thread is opposites to that of the first inner thread. That is, the first inner thread of the insulation theft-proof element 60 is designed opposite to the outer thread of the bottom seat 12 (and the second inner thread of the insulation theft-proof element 60). When the bottom seat 12 is screwed to the air-intake mouth, the insulation theft-proof element 60 screws to the bottom seat 12 then, let the bottom seat 12 is embedded into the insulation theft-proof element 60, in which because the insulation theft-proof element 60 has a specific profile, the user needs to utilize the specific hand tools to rotate the insulation theft-proof element 60 and the bottom seat 12. Otherwise the bottom seat 12 is rotated in the opposite direction, and the insulation theft-proof element 60 will be engaged with the bottom seat tightness, such that the theft cannot steal the tire temperature and tire pressure wireless sensing device of the invention.

Figure 5:
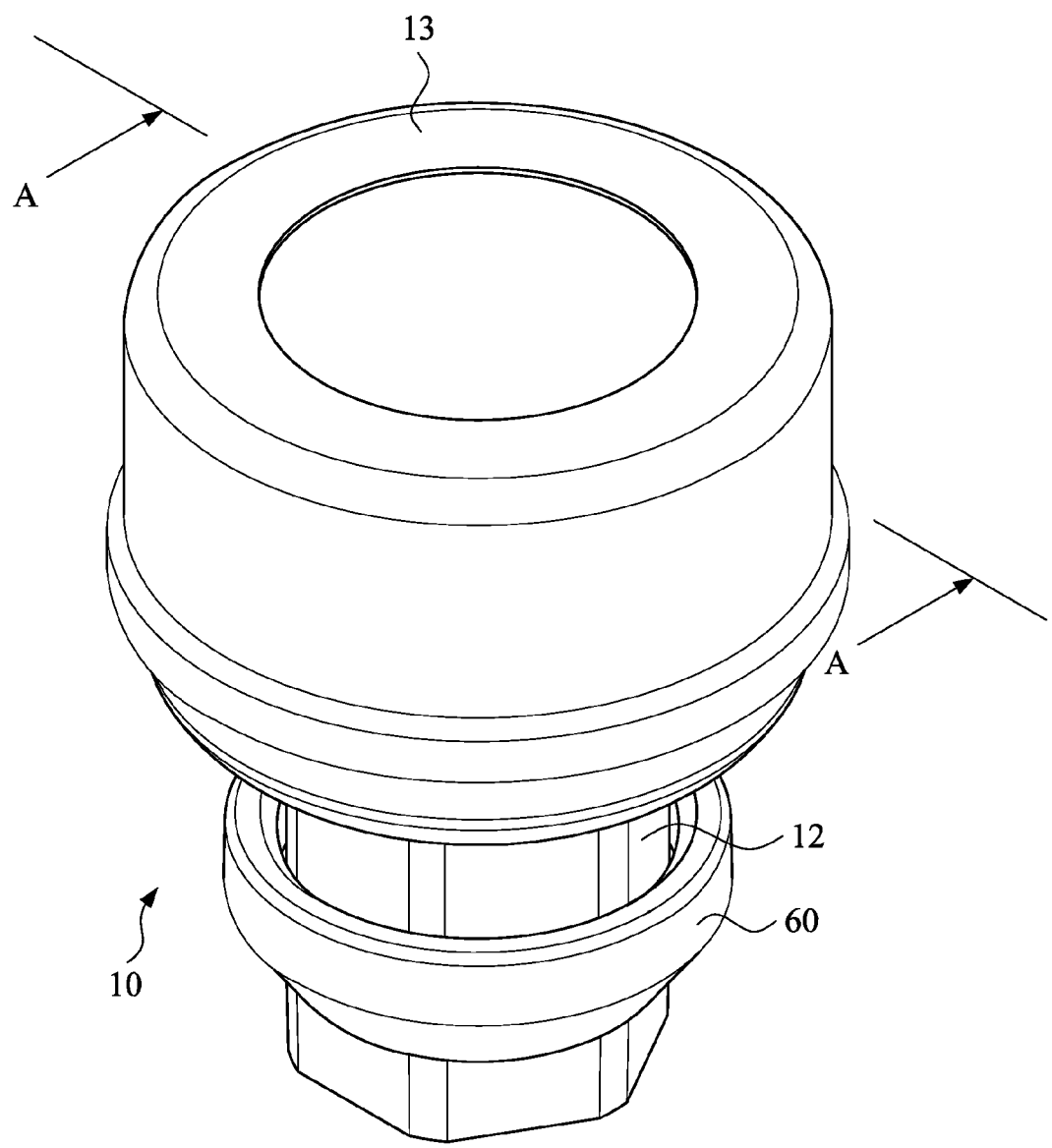
FIG. 5 is a perspective view of a tire temperature and tire pressure wireless sensing device of a second embodiment in accordance with the present invention.
Figure 6:
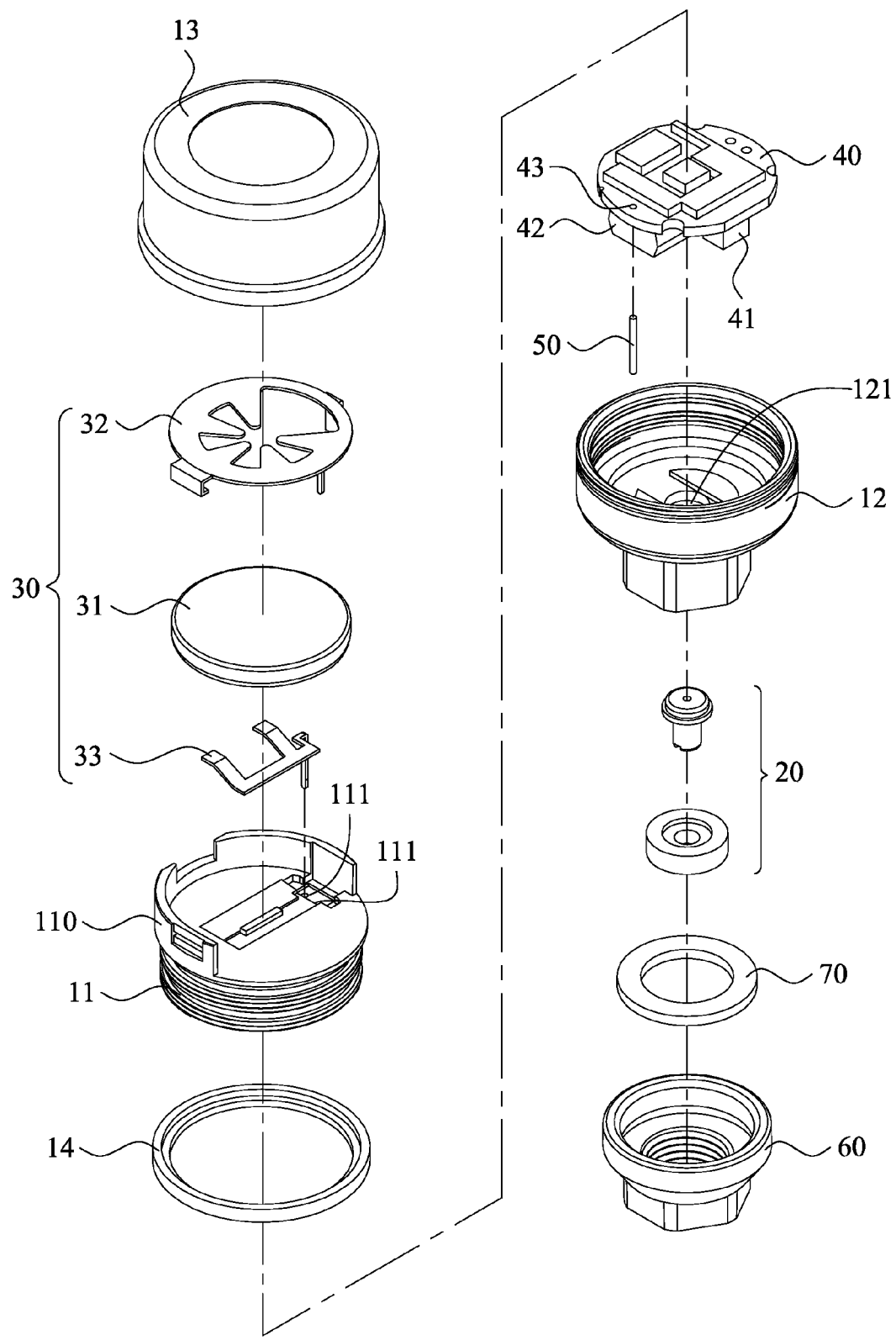
FIG. 6 is an exploded view of a second embodiment of a tire temperature and tire pressure wireless sensing device in accordance with the present invention.
Figure 7:
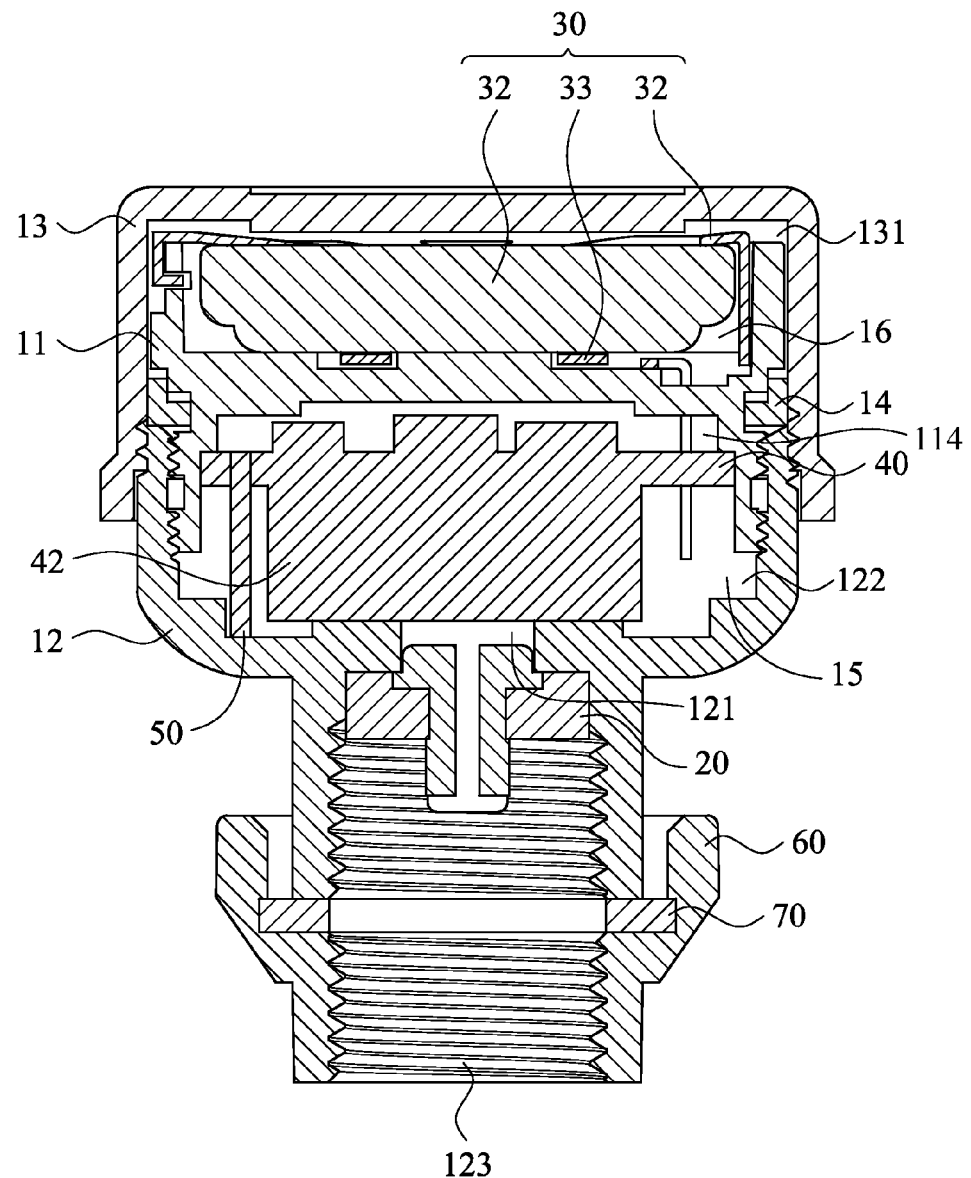
FIG. 7 is a cross-sectional view taken along line A-A of FIG. 6.
Figure 8:
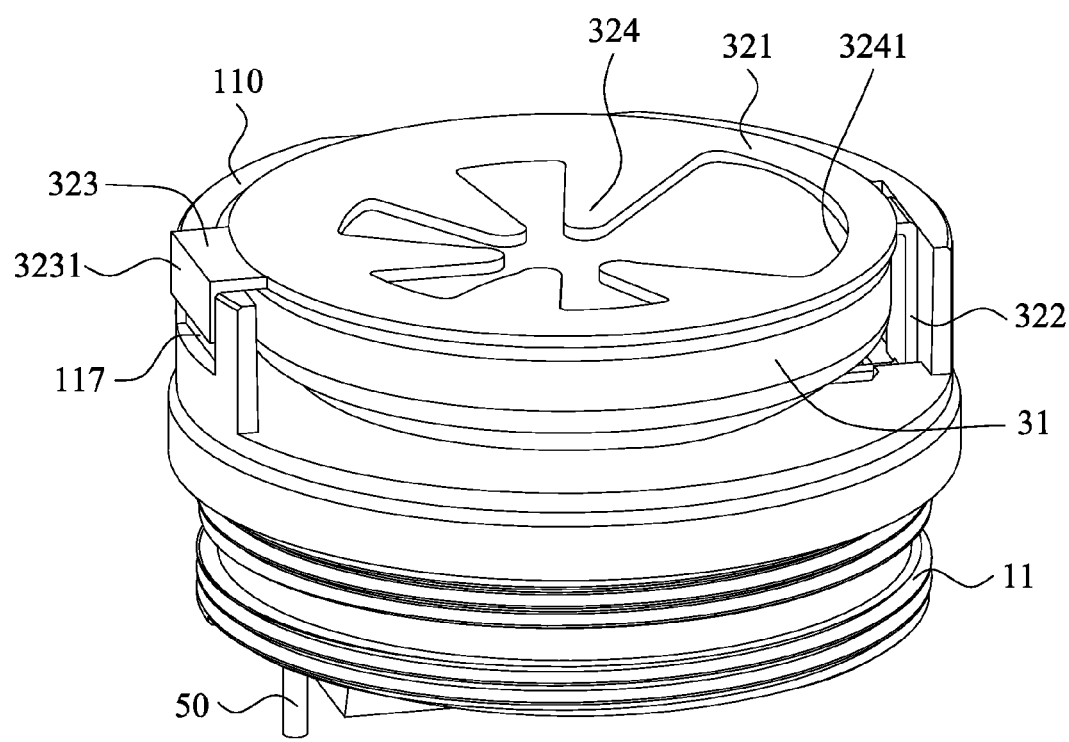
FIG. 8 is a perspective view of a power supply module disposed on the fixed seat of a second embodiment of a tire temperature and tire pressure wireless sensing device in accordance with the present invention.

With reference to the drawings and in particular to FIG. 5 to FIG. 8, a structure of a second embodiment of a tire temperature and a tire pressure wireless sensing device is shown. The tire temperature and tire pressure wireless sensing device includes a housing 10, a valve body 20, a power supply module 30, a circuit board 40 and a transmission antenna 50.

The housing 10 includes a fixed seat 11, a bottom seat 12 with a first recess 122 and a cap 13 with a second recess 131. The fixed seat 11 is made by the plastic injection molding. The bottom side of the fixed seat 11 includes a circular sidewall which is engaged with the bottom seat 12 to form an air chamber 15 therein. In this embodiment, the bottom side of the fixed seat 11 includes a corresponding recess 114 that is disposed in the circular sidewall, in which the outside of the circular sidewall includes an outer thread, and the top side of the bottom seat 12 includes a first recess 122. The inner wall of the first recess 122 includes an inner thread which is engaged with the outside of the circuit sidewall of the fixed seat 11, and is jointed the corresponding recess 114 of the fixed seat 11 to form the air chamber 15. A glue layer is coated on the junction portion between the inner wall of the first recess 122 and the outside of the circular sidewall of the fixed seat 11 to increase the tightness of the air chamber to achieve the completely airtight effect, so that the accuracy detection can be increased. The top side of the fixed seat 11 includes a semi-circular sidewall 110, and the bottom seat 12 is engaged with the cap 13 to form an accommodation space 16. In this embodiment, the outer sidewall of the bottom seat 12 includes an outer thread, and the cap 13 includes a second recess 131 with an inner thread on the inner wall, in which the inner thread of the cap 13 is screwed to the outer thread of the bottom seat 12 to form the accommodation space 16. The fixed seat 11 includes two conductive element through holes 111, in which the two conductive element through holes 111 are penetrated the fixed seat 11. The bottom seat 12 includes an air-intake through hole 121 and an air-intake seat is communicated the bottom side of the air-intake through hole 121. Preferably, the fixed seat 11 is further engaged with the sealing glue ring 14, the central of the outside of the fixed seat 11 includes a groove, and the sealing glue ring 14 is engaged with the groove, such that the accommodation space can be tightness to prevent the gas and water entering.

The valve body 20 is disposed in the air-intake seat 123, and one end of the valve body 20 is engaged with the air-intake through hole 121.

The power supply module 30 is disposed in the fixed seat 11 and is accommodated in the accommodation space 16. The power supply module 30 includes a battery 31, a first conductive element 32 and a second conductive element 33. One end of the first conductive element 32 and one end of the second conductive element 33 are inserted into the two conductive element through holes 111 respectively and is electrically connected with the circuit board 40. Another end of the first conductive element 32 and another end of the second conductive element 33 are electrically connected with two electrodes of the battery 31, in which the first conductive element 32 and the second conductive element 33 are disposed on the top and bottom of the battery 31 respectively, and one end of the first conductive element 32 is disposed across the battery 31 and is inserted into the conductive element through hole 111. Thus, the battery 31 is clamped between the first conductive element 32 and the second conductive element 33, and is disposed on the fixed seat 11. Because one side of the fixed seat 11 is a semi-circular sidewall 110, another side of the fixed seat 11 is a semi-circular notch, such that the battery 31 can be replaced easily. In this embodiment, the first conductive element 32 includes an outer ring 321, two extension segments 322, 323 and a plurality of claw springs 324, in which the plurality of claw springs 324 is protruded inwardly and downwardly to contact the battery 31 and a notch 3241 which is disposed between the plurality of claw springs 324, such that the battery 31 can be replaced easily. Two extension segments 322, 323 are bent and extended downwardly from the two opposite ends of the outer ring 321 and is disposed across the battery 31, in which one extension segment 322 is inserted into a conductive element through hole 111 of the fixed seat 11, and another extension segment 323 includes a button hole 3231 to snap-fit on a protrusion 117 of the sidewall of the fixed seat 11.

The circuit board 40 is disposed on the air chamber 15, and the circuit board 40 is electrically connected with the first conductive element 32 and the second conductive element 33. The circuit board 40 includes a wireless transmission module 41, a sensing module 42 and an antenna slot 43, and the circuit board 40 is electrically connected with the wireless transmission module 41 and the sensing module 42 respectively. The sensing module 42 is disposed corresponding to the air-intake through hole 121. The sensing module 42 transmits the detection data to the circuit board 40, and the wireless transmission module 41 emits the wireless signal through the antenna 50. In this embodiment, the wireless transmission module 41 is disposed on the bottom side of the circuit board 40, and the sensing module 42 is disposed on the bottom side of the circuit board 40 and is disposed corresponding to the air-intake through hole 121. The Antenna slot 43 is electrically connected with the wireless transmission module 41. The sensing module 42 can detect the gas which is discharged from the valve body 20 directly to detect the instant and accurate gas temperature and pressure when the sensing module 42 is disposed corresponding to the air-intake through hoe 121 of the bottom seat 12 and one end of the valve 20 is engaged with the air-intake through hole 121. In addition, the wireless transmission module 41 transmits the update control program by wireless transmission into the sensing module 42, so as to the setting of the control program can always be changed. In addition, the stored data can be read through the wireless transmission by the wireless transmission module 42.

One end of the transmission antenna 50 is accommodated in the antenna slot 43 and is electrically connected with the circuit board 40. The transmission antenna 50 is extended downwardly from the circuit board 50 to the bottom seat 12 to form a stick-like antenna. Preferably, a glue layer is coated on the junction between the transmission antenna 50 and the antenna slot 43 to prevent the gas leakage. In this embodiment, the transmission antenna 50 is a round stick-like metal conductor, but the shaped of the transmission antenna 50 is not limited herein. The transmission antenna 50 is extended downwardly along perpendicular to a horizontal direction of the circuit board 40 and to contact with the bottom seat 12, such that a good electromagnetic field can be formed between the power supply module 30 to emit the wireless signal and to prevent the signal attenuation. Because the extension of the transmission antenna 50 is perpendicular to the circuit board 40 and is perpendicular to a horizontal direction of the battery 30, the wireless transmission will not be affected by the microwave during the operation of the circuit board 40 and the battery 30, such that the better wireless transmission effect can be obtained. The principle is similar to a traditional antenna is perpendicular to the ground to cause the over longer transmission distance. In addition, because the stick-like antenna is flexible, when the vibration is caused by the vehicle running, the transmission antenna 50 can absorb the vibration and always contact with the bottom seat 12 to improve the drawback of the metal connection terminal is easy to fall to cause the poor contact.

Preferably, the bottom side of the bottom seat 12 is further engaged with an insulation theft-proof element 60. A sealing metal spacer 70 is disposed between the bottom side of the bottom seat 12 and the insulation theft-proof element 60. The inside of the bottom side of the bottom seat 12 includes an inner thread, and the bottom side of the insulation theft-proof element 60 includes a corresponding inner thread. The spiral direction of the corresponding inner thread is the same as that of the inner thread of the bottom side of the bottom seat 12, in which the bottom seat 12 and the insulation theft-proof element 60 are screwed to the air-intake mouth in the same spiral directions, and then the insulation theft-proof element 60 is rotated in opposite spiral directions, such that the top surface of the insulation theft-proof element 60 will be contacted the sealing metal spacer 70 and the bottom surface of the bottom seat 12. Thus, the inner thread of the bottom seat 12 is clamped the thread of the air-intake mouth, and the bottom seat 12 cannot be easily unscrewed. In addition, the insulation theft-proof element 60 has a specific profile, the user must utilize the specific hand tools to unscrew the insulation theft-proof element 60 and the bottom seat 12. If the bottom seat 12 is rotated in opposite direction so as to the insulation theft-proof element 60 is engaged with the bottom seat closely, such that the theft cannot steal the tire temperature and tire pressure wireless sensing device of the invention. Furthermore, the sealing metal spacer 70 is an annular copper plate which has a via hole for the air-intake mouth passed through. Because the sealing metal spacer 70 is disposed between the bottom side of the bottom seat 12 and the top side of the insulation theft-proof element 60, the insulation theft-proof element 60 is rotated outward and to apply a force upwardly to the bottom seat 12. This force will press to generate a thread between the bottom side of the bottom seat 12 and the top side of the insulation theft-proof element 60, such that the thread can seal the gap between the bottom side of the bottom seat 12 and the top side of the insulation theft-proof element 60 to achieve the airtight effect. In addition, the insulation theft-proof element 60 encapsulated the bottom seat 12 and the sealing metal spacer 70 to prevent the oxidation of the bottom seat 12 and the sealing metal spacer 70 so as to allow the longer use period.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A tire temperature and tire pressure wireless sensing device, comprising:
   a housing includes a fixed seat, a bottom seat with a first recess, and a cap with a second recess, a bottom side of said fixed seat is engaged with said bottom seat to form an air chamber, and said bottom seat is engaged with said cap to form an accommodation space, a top side of said fixed seat includes a semi-circular sidewall and said semi-circular sidewall has an annular groove which is mounted inside said cap, and said fixed seat includes two conductive element through holes and an antenna slot, said antenna slot is disposed adjacent to one end of said annular groove, and said bottom seat includes an air-intake through hole and an air-intake seat which is communicated with a bottom side of the air-intake through hole;
   a valve body is disposed in said air-intake seat, and said valve body is engaged with said air-intake through hole;
   a circuit board is disposed in said air chamber, and said circuit board includes a wireless transmission module and a sensing module therein, said circuit board is electrically connected with said wireless transmission module and said sensing module, and said sensing module is disposed corresponding to said air-intake though hole;
   a power supply module is disposed on said fixed seat, said power supply module includes a battery, a first conductive element and a second conductive element, one end of said first conductive element and one end of said second conductive element are inserted into said two conductive element through holes respectively and are electrically connected with said circuit board, and another end of said first conductive element and another end of said second conductive element are electrically connected with two electrodes of said battery respectively; and
   a transmission antenna is disposed in said annular groove and one end of said transmission antenna is inserted into said antenna slot and is electrically connected with said circuit board.

2. The tire temperature and tire pressure wireless sensing device according to claim 1, wherein said fixed seat is further engaged with a sealing glue ring, and a groove is disposed in the central of an outer of said fixed seat to place said sealing glue ring.

3. The tire temperature and tire pressure wireless sensing device according to claim 1, wherein said first conductive element and said second conductive element are disposed on a bottom side and a top side of said battery respectively, and one end of said first conductive element is disposed across said battery to insert into said conductive element through hole of said fixed seat.

4. The tire temperature and tire pressure wireless sensing device according to claim 1, wherein said bottom side of said fixed seat includes a corresponding recess, said first recess of said bottom seat is engaged with an outer sidewall of said fixed seat, and is engaged with said corresponding recess to form said air chamber.

5. The tire temperature and tire pressure wireless sensing device according to claim 1, a bottom side of said bottom seat is further engaged with an insulation theft-proof element, an outer of said bottom side of said bottom seat includes an outer thread, and a top side of said insulation theft-proof element includes a first inner thread corresponding to said outer thread of said bottom side of said bottom seat to screw each other, a bottom side of said insulation theft-proof element has a second inner thread, said second inner thread and said inner thread of said bottom side of said bottom seat has the same spiral directions, and said second inner thread and said first inner thread has different spiral directions.

6. A tire temperature and tire pressure wireless sensing device, comprising:
    a housing includes a fixed seat, a bottom seat with a first recess and a cap with a second recess, a bottom side of said fixed seat is engaged with said bottom seat to form an air chamber, and said bottom seat is engaged with said cap to form an accommodation space, said bottom seat includes an air-intake through hole and an air-intake seat which is communicated with a bottom side of said air-intake through hole;
    a valve body is disposed in said air-intake seat, and said valve body is engaged with said air-intake through hole;
    a circuit board is disposed in said air chamber, said circuit board includes a wireless transmission module, a sensing module and an antenna slot, and said circuit board is electrically connected with said wireless transmission module and said sensing module, and said sensing module is disposed corresponding to said air-intake though hole;
    a power supply module is disposed on said fixed seat, said power supply module includes a battery, a first conductive element, and a second conductive element, one end of said first conductive element and one end of said second conductive element are electrically connected with said circuit board respectively, and another end of said first conductive element and another end of said second conductive element are electrically connected with said two electrodes of said battery respectively; and
    a transmission antenna, one end of said transmission antenna is disposed in said antenna slot and is electrically connected with said circuit board, and said transmission antenna is extended downwardly from said circuit board to said bottom seat to form a stick-shaped antenna.

7. The tire temperature and tire pressure wireless sensing device according to claim 6, wherein said transmission antenna is extended downwardly along perpendicular to a horizontal direction of said circuit board.

8. The tire temperature and tire pressure wireless sensing device according to claim 6, wherein a top side of said fixed seat includes a semi-circular sidewall.

9. The tire temperature and tire pressure wireless sensing device according to claim 6, wherein said fixed seat further comprises a sealing glue ring, and a groove is disposed in a central of an outside of said fixed seat to place said sealing glue ring.

10. The tire temperature and tire pressure wireless sensing device according to claim 6, wherein said fixed seat comprises two conductive element through holes, said first conductive element and said second conductive element are inserted into said two conductive element through holes respectively to electrically connect with said circuit board.

11. The tire temperature and tire pressure wireless sensing device according to claim 6, wherein said first conductive element and said second conductive element are disposed on a top side and a bottom side of said battery respectively, and one end of said first conductive element is disposed across said battery to electrically connect with said circuit board.

12. The tire temperature and tire pressure wireless sensing device according to claim 6, wherein said bottom side of said fixed seat includes a corresponding recess, said first recess of said bottom seat is engaged with an outer sidewall of said fixed seat, and is engaged with said corresponding recess to form said air chamber.

13. The tire temperature and tire pressure wireless sensing device according to claim 6, wherein said bottom side of said bottom seat is further engaged with an insulation theft-proof element, said bottom side of inner of said bottom seat includes an inner thread, a bottom side of said insulation theft-proof element includes a corresponding inner thread, and said corresponding inner thread and said inner thread of said bottom side of said bottom seat has the same spiral directions.

14. The tire temperature and tire pressure wireless sensing device according to claim 6, wherein a sealing metal spacer is disposed between said bottom side of said bottom seat and said insulation theft-proof element.

* * * * *